United States Patent [19]

Nix et al.

[11] 4,336,963
[45] * Jun. 29, 1982

[54] TRUCK BED LINER

[76] Inventors: Edwin L. Nix, 733 Tahlena Ave.;
Bobby E. Davenport, 317 Beckley
Dr., both of Madison, Tenn. 37115

[*] Notice: The portion of the term of this patent subsequent to Sep. 5, 1995, has been disclaimed.

[21] Appl. No.: 13,170

[22] Filed: Feb. 21, 1979

[51] Int. Cl.³ .............................................. B62D 33/02
[52] U.S. Cl. ................................. 296/39 R; 224/42.42
[58] Field of Search ............. 296/39 R; 224/42.42 R,
224/404; 280/653, 33.99 A, 770; 105/423;
220/1 V, 400, DIG. 12, DIG. 14, DIG. 23

[56] References Cited

U.S. PATENT DOCUMENTS

| | | | |
|---|---|---|---|
| 1,151,972 | 8/1915 | Skreberg | 296/39 R |
| 3,881,768 | 5/1975 | Nix | 296/39 R |
| 4,047,749 | 9/1977 | Lambitz | 296/39 R |
| 4,111,481 | 9/1978 | Nix | 296/39 R |
| 4,122,973 | 10/1978 | Ahern | 220/404 |

*Primary Examiner*—Joseph F. Peters, Jr.
*Assistant Examiner*—John A. Carroll
*Attorney, Agent, or Firm*—Harrington A. Lackey

[57] ABSTRACT

A truck bed liner including an integrally formed bottom wall, front wall and opposed side walls, in which each of the opposed side walls, and preferably the front wall, terminate in top edge portions forming outwardly projecting hook-shaped flanges adapted to snap-fasten over the corresponding top ledges and free rims of the corresponding side walls and front wall of a truck bed within which the liner fits.

5 Claims, 3 Drawing Figures

TRUCK BED LINER

BACKGROUND OF THE INVENTION

Molded plastic bed liners are known in the art as evidenced by the following U.S. Pat. Nos.

| | |
|---|---|
| 3,814,473 Lorenzen, Jr. | June 4, 1974 |
| 3,881,768 Nix | May 6, 1975 |
| 4,111,481 Nix et al. | Sept. 5, 1978 |

Although the truck bed liners disclosed in the above U.S. patents include integrally molded bottom, front and side walls, the side and front walls having top flanges projecting over corresponding top edges of the walls of the truck bed, nevertheless, separate fastener members must be provided for securing the truck bed liner to the truck bed. Otherwise, air, encountered by a fast moving truck, flows between the front wall of the truck bed liner and the truck bed to force the liner rearward out of the truck bed, where the tailgate remains down or open. One such fastener employed for securing the liner to the truck is disclosed in the above Nix et al. U.S. Pat. No. 4,111,481.

SUMMARY OF THE INVENTION

It is therefore an object of this invention to provide a truck bed liner of the integral, molded plastic type which can be easily and detachably secured to the truck bed liner without independent fastener members.

It is a further object of this invention to provide an integral truck bed liner having a bottom wall, front wall and side walls. Each of the front and side walls not only have laterally projecting top flanges, but are provided with hook-shaped flanges of sufficient rigidity and elasticity to snap-fasten over the tops of the corresponding side walls of the truck bed. Such snap-fastening, hook-shaped flanges eliminate the need for separate and independent fastener members, and not only facilitate, but expedite the secure mounting on the liner within the truck bed, regardless of whether the tailgate is open or closed.

The hook-shaped flanges for each of the side walls and/or front wall and integrally formed with the top edge portion of the corresponding liner wall and are provided with a flange portion which projects laterally outward and terminates in a downturned lip of sufficient depth to securely engage and receive a corresponding rim of the top ledges of the corresponding bed wall. The hook-shaped flanges, including the laterally projecting flange portion and downturned lip, are preferably shaped to conform to the configuration of the corresponding truck bed wall. However, the downturned lip must extend sufficiently far downward to effect a secure snap-fastener grip upon the top ledge of the corresponding bed wall, without any additional tools or fasteners.

DESCRIPTION OF THE PREFERRED EMBODIMENTS

Figure 1:
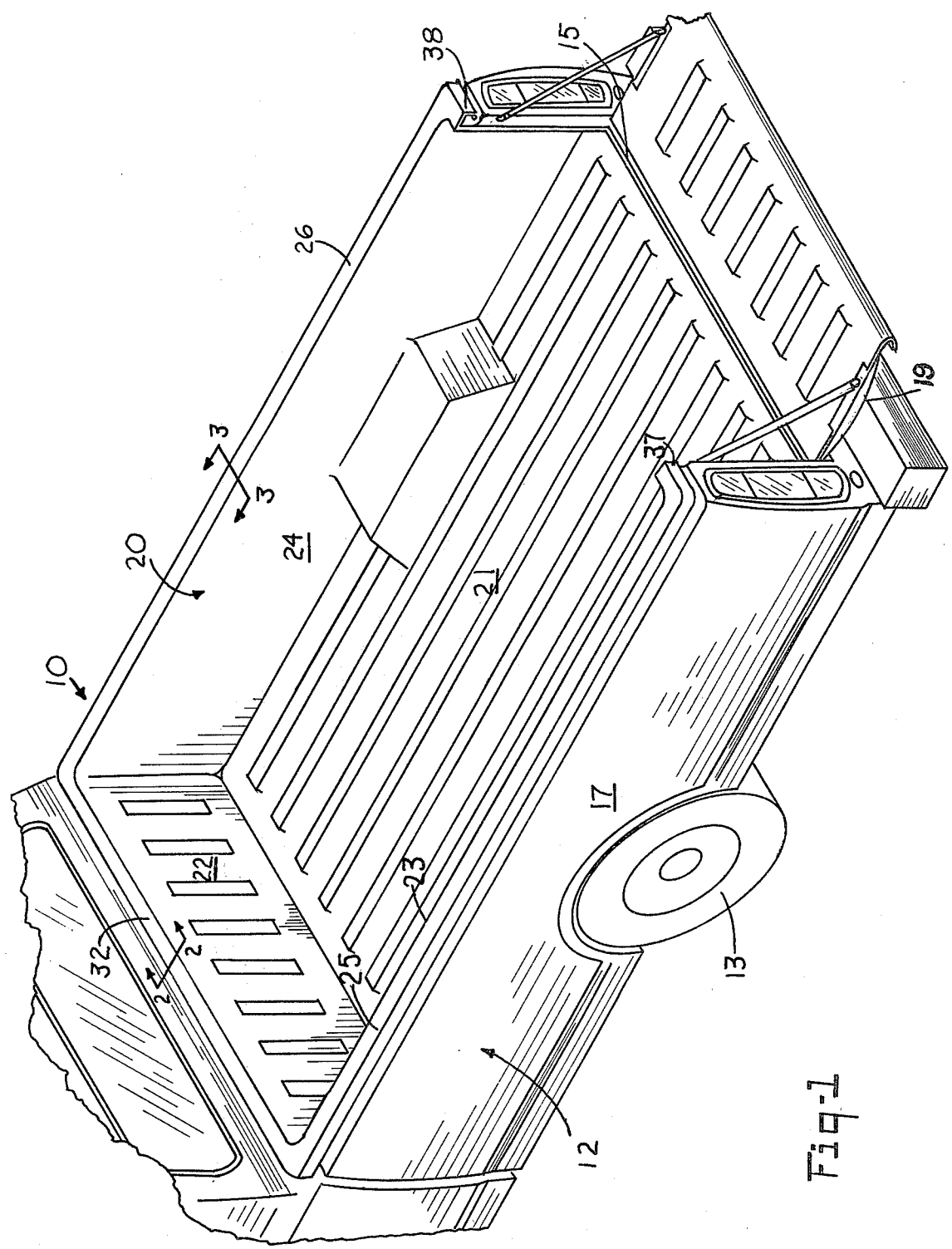
FIG. 1 is a fragmentary, rear, perspective view of a conventional pickup truck, having a truck bed liner, made in accordance with this invention, mounted in operative position within the bed of the pickup truck, with the tailgate in open position.

Referring now to the drawings in more detail, FIG. 1 discloses a conventional pickup truck 10, particularly a miniature or economy-size pickup truck, such as the Datsun, Toyota, or the economy-size or small-size pickup truck produced by Ford, Chevrolet or GMC. The miniature or economy-size pickup truck 10 usually has a single-body wall, as opposed to a double-wall for larger pickup trucks, for its truck bed or cargo compartment 12, supported upon the wheels 13. The bed 12 includes a bottom wall 15, front wall 16 and opposed side walls 17 and 18. Most truck beds 12 also include a tailgate 19.

The truck bed liner 20 made in accordance with this invention includes a bottom wall 21, a front wall 22 and opposed side walls 23 and 24.

All of the walls 21, 22, 23 and 24 are integrally formed, such as by molding from plastic material. The plastic material is preferably a durable, high-impact styrene sheet material, such as ABS (Acrylonitrile Butadiene Styrene) and more particularly made of ABS-LS plastic, which is a more durable acrylonitrile butadiene styrene sheet material including an additive or filler known in the trade as "LS." The plastic material is preferably approximately 300 mils thick, and also is preferably laminated or covered with a "KORAD" film to function as an ultra-violet ray inhibitor to prolong the life of the plastic material against the ultra-violet rays from the sun.

The walls 21, 22, 23 and 24 substantially conform to the interior surfaces of the corresponding bottom wall 15, front wall 16, and side walls 17 and 18 of the truck bed 12.

Figure 3:
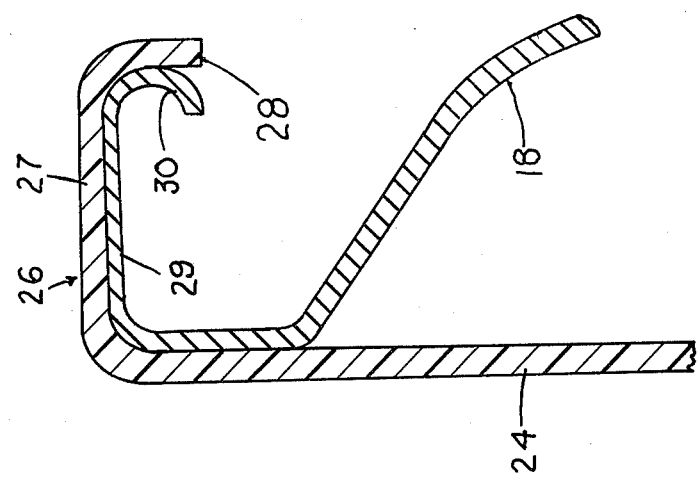
FIG. 3 is an enlarged fragmentary section taken along the line 3—3 of FIG. 1.

Each of the side walls 23 and 24 terminate in their upper edge portions in laterally outwardly projecting hook-shaped flanges 25 and 26, respectively, which are adapted to snap-fasten over the upper edges of the respective side walls 17 and 18 of the truck bed 12. The hook-shaped flange 26, which is identical in construction to the hook-shaped flange 25, is best disclosed in FIG. 3, as having a substantially horizontally extending, flat, flange portion 27 terminating in a downwardly projecting lip 28. The flange portion 27 and the lip 28 are shaped to substantially conform to the top ledge 29 and free rim 30 of the side wall 18 of the truck bed 12. The lip 28 depends only a distance sufficient to permit the hook-shaped flange 26 to snap-fasten about the ledge 29 and rim 30. The flange portion 27 and depending lip 28 preferably extend continuously longitudinally for the entire length of the respective side walls 23 and 24.

Figure 2:
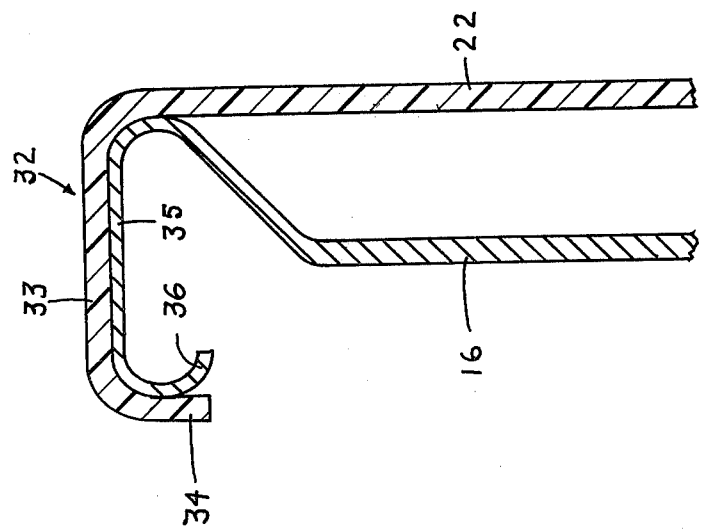
FIG. 2 is an enlarged fragmentary section taken along the line 2—2 of FIG. 1.

The front liner wall 22 is also provided with a forwardly projecting hook-shaped flange 32 having a substantially horizontal flat flange portion 33 and a front depending lip 34, as disclosed in FIG. 2. The front hook-shaped flange 32 is also adapted to snap-fasten over the top ledge 35 and depending rim 36 of the front wall 16, and substantially conform to the shape of the top ledge 35 and front rim 36. Again, the depth of the lip 34 is sufficient to snugly receive and engage the front rim 36 to facilitate the detachable snap-fastening of the front hook-shaped flange 32 over the top ledge 35. The flange portion 33 and the lip 34 also extend longitudinally and continuously the full length of the front wall 16, and are preferably integral at their opposite ends with the adjacent ends of the side wall flange portions 27 and lip 28. Such continuity of the hook-shaped flanges 26 and 32 not only assures complete snap-fastening of the hook-shaped flanges 26 and 32 over the respective top ledges 29 and 35, but also provides additional rigidity to the entire truck bed liner 20.

The snap-fastening of the front hook-shaped flange 32 over the top ledge 35 is especially important to prevent rearward shifting or movement of the entire truck bed liner 20, while the pickup truck 10 is moving forward, and which would normally produce a buildup of compressed air between the front wall 16 and the front liner wall 22.

In the preferred form of the invention, the rear end portions of the side wall hook-shaped flanges 25 and 26 continue inward to form rear hook-shaped flanges 37 and 38 (FIG. 1), having substantially the same construction as flanges 25 and 26. The rear hook-shaped flanges 37 and 38 are adapted to snap-fasten over corresponding portions of the inturned top ledges at the rear of the truck body 12, for further securement of the truck bed liner 20 in the truck bed 12.

Because of the semi-rigidity and elasticity of the sheet material, and the particular shape of the hook-shaped flanges 25, 26, and 32, no independent fasteners are required for securing the truck bed liner 22 to the truck bed 12. Moreover, no tools at all are required for securing the truck bed liner 20 within the truck bed 12.

The hook-shaped flanges 25, 26 and 32 may be made in different shapes and forms, particularly to conform to the particular shape of the top ledges and rims of the respective body walls, so long as the hook-shaped flanges extend entirely across and down on the exterior sides of the upper portions of the respective sides and front walls in order to prevent lateral displacement of a liner wall relative to its corresponding body wall of the truck bed. Yet, the depending lips of the respective hook-shaped flanges do not extend so far down, or even so far inward, that the respective hook-shaped flanges cannot be readily released by raising the entire truck bed liner 20 relative to the truck bed 12. They may be a tight enough fit between a respective hook-shaped flange, such as flange 26, and its top ledge 29 and rim 30 that it may require a certain moderate degree of manual downward force, to cause the hook-shaped flange 26 to snap over the top ledge 29 and its rim 30.

It is possible that the flange portion 27 may not necessarily be truly horizontal or even flat in order to conform to the corresponding surface of top ledge 29, so long as the snap-fastening effect is retained.

The shape of the respective hook-shaped flanges 25, 26, 32, 37 and 38, may also depend upon the degree of elasticity of the plastic material, and the rigidity, including the thickness and strength, of the material incorporating the respective hook-shaped flanges.

In the preferred form of the invention, the truck bed liner 20 is preferably vacuum-formed from the ABS-LS plastic material.

What is claimed is:

1. A protective liner for a rectangular truck bed having a bottom wall, a front wall, opposed side walls, and an open rear end, closable by a tailgate, each front wall and side wall having an interior surface, an exterior surface and a top ledge projecting outward from each interior surface and terminating in a free rim, comprising:
    (a) an integral bottom liner wall, front liner wall and opposed side liner walls of continuous, semi-rigid material adapted to fit within the interior surfaces of the corresponding bottom wall, front wall and opposing side walls of the truck bed, in operative position,
    (b) said side liner walls terminating in rear end portions spaced apart to form a rear opening to substantially conform with the open rear end of the truck bed, in operative position,
    (c) each of said side liner walls having a top portion, and a hook-shaped flange integrally formed with, and projecting laterally outward from, said top portion,
    (d) each of said hook-shaped flanges having a substantially transverse flange portion projecting outward across the top ledge of the corresponding truck bed side wall, and an outer lip projecting downward from said flange portion outside of and substantially against the free rim of said corresponding truck bed wall, in operative position, and
    (e) each of said hook-shaped flanges being substantially semi-rigid for fitting over said corresponding top ledge and free rim, to hold said side liner walls upon their corresponding truck bed side walls without any independent fastener member in operative position.

2. The invention according to claim 1 in which said front liner wall has a top portion, and a hook-shaped flange integrally formed with, and projecting laterally outward from, said top portion, the top portion and the hook-shaped flange of said front wall being integrally joined and continuous with the corresponding top portions and hook-shaped flanges of both said side walls, whereby the hook-shaped flange of said front liner wall fits over the top ledge and free rim of the front wall of the truck bed, in operative position.

3. The invention according to claim 1 in which said continuous, semi-rigid material of said integral bottom liner wall, front liner wall, and opposed side liner walls, is substantially of uniform thickness.

4. The invention according to claim 1 in which each of said substantially transverse flange portions fits against the top ledge of the corresponding truck bed side wall and each of said outer lips fits against the free rim of the corresponding truck bed side wall, and each of said hook-shaped flanges is sufficiently elastic to snap-fasten over said corresponding top ledge and free rim, in operative position.

5. The invention according to claim 1 in which all of said liner walls are formed of a unitary, semi-rigid, high-impact resistant, styrene plastic sheet material.

* * * * *